United States Patent [19]
Ayerst et al.

[11] Patent Number: 5,638,369
[45] Date of Patent: Jun. 10, 1997

[54] METHOD AND APPARATUS FOR INBOUND CHANNEL SELECTION IN A COMMUNICATION SYSTEM

[75] Inventors: Douglas I. Ayerst, Delray Beach, Fla.; Gregory Cannon, Keller, Tex.; Malik J. Khan, Lake Worth; Richard A. Hill, Boca Raton, both of Fla.

[73] Assignee: Motorola, Inc., Schaumburg, Ill.

[21] Appl. No.: 498,212

[22] Filed: Jul. 5, 1995

[51] Int. Cl.⁶ .................. H04J 3/16; H04Q 7/20
[52] U.S. Cl. .............. 370/346; 370/447; 340/825.44; 379/57; 455/38.1; 455/54.2
[58] Field of Search .............. 370/85.2, 85.3, 370/85.7, 85.8, 94.1, 95.1, 95.2, 95.3, 100.1, 110.1; 379/57, 58, 59, 63; 455/33.1, 34.1, 34.2, 38.1, 53.1, 54.1, 54.2; 340/825.08, 825.44, 825.47, 825.54

[56] References Cited

U.S. PATENT DOCUMENTS

| | | | |
|---|---|---|---|
| 5,166,929 | 11/1992 | Lo | 370/85.3 |
| 5,181,200 | 1/1993 | Harrison | 370/95.1 |
| 5,311,516 | 5/1994 | Kuznicki et al. | 370/94.1 |
| 5,371,899 | 12/1994 | Kuznicki et al. | 455/34.1 |
| 5,422,733 | 6/1995 | Merchant et al. | 379/58 |
| 5,521,926 | 5/1996 | Ayerst et al. | 370/95.3 |

Primary Examiner—Alpus H. Hsu
Attorney, Agent, or Firm—James A. Lamb

[57] ABSTRACT

A system controller (102) is used in a communication system (100) which has a set of inbound channels. The system controller (102) includes a processing system (204) for generating a first message which is transmitted to selective call devices (106). The first message includes a subset identifier which identifies an ALOHA subset of the set of inbound channels for use by a set of the selective call devices (106). A selective call device (106) includes a transmitter (708) and a processing system (710). The processing system (710) identifies the ALOHA subset of the set of inbound channels, and generates a second message and couples the second message to the transmitter (708) using an ALOHA protocol on an inbound channel which is in the ALOHA subset of the set of inbound channels when the second message is a first type. The transmitter (708) transmits the second message.

20 Claims, 7 Drawing Sheets

METHOD AND APPARATUS FOR INBOUND CHANNEL SELECTION IN A COMMUNICATION SYSTEM

RELATED APPLICATIONS

Application Ser. No. 08/397,322 filed Feb. 28, 1995 by Gorday et al., entitled "Method and Apparatus for Determining a Quality Level of an Analog Signal in a Radio Communication System", allowed May 23, 1996.

FIELD OF THE INVENTION

This invention relates in general to multichannel communication systems and in particular to selecting an inbound radio channel for transmission of a message using a contention protocol.

BACKGROUND OF THE INVENTION

Known techniques of transmitting inbound messages in a multichannel communication system which includes a plurality of selective call devices and which has a plurality of inbound channels are techniques which use a scheduled inbound transmission protocol and techniques which use a contention (unscheduled) inbound transmission protocol. An example of a scheduled transmission protocol is a transmission protocol in which at least one predetermined time slot is reserved on at least one predetermined inbound channel for each selective call device which is active in the communication system. Another example of a scheduled inbound transmission protocol is a transmission protocol in which a selective call device is notified of a demand response time slot to be used for transmitting a long inbound message. The notification is given within an outbound message which is sent in response to a short inbound message sent by the selective call device informing the communication system of the existence of the long inbound message.

An example of a contention inbound transmission protocol is an ALOHA protocol, which is well known to one of ordinary skill in the art. Inbound messages sent by an ALOHA protocol are typically transmitted as soon as they are generated. When two such messages happen to be transmitted on one channel such that some portions are transmitted simultaneously, one or both messages may not be received correctly. In this event, the messages are not acknowledged by the communication system and each selective call device repeats the message after a random delay.

The communication system may be a wireline or optical or radio communication system. In a wireline system, the inbound channels may be separated by physically different wires, or may separated (particularly in the case of high speed wireline systems) by band limited channels, or by both. In optical or radio communication systems, the channels are typically separated by band limited channels, but may be alternatively or additionally be separated by time division duplexing.

Some systems which have an outbound signaling protocol which is synchronous are designed so that the selective call devices acquire synchronism to the outbound signaling protocol and use a scheduled inbound transmission protocol, because a scheduled inbound transmission protocol is typically more efficient than a contention inbound transmission protocol for several types of inbound messages, such as some demand responses and acknowledgments. However, a contention transmission protocol can be typically more efficient for other types of inbound messages, such as some unsolicited inbound messages. Thus it can be desirable to provide for both types of inbound transmission protocols.

Prior art systems typically provide for a mix of scheduled and contention inbound transmission protocols by designating some types of messages to be transmitted using an ALOHA protocol and other types of messages to be transmitted using a scheduled transmission protocol. A selective call device then uses the indicated technique on an authorized inbound channel. The authorized inbound channel is typically any one of the inbound channels which the selective call device is designed to use.

However, in some communication systems, some inbound channels are not as efficient when used for inbound messages when using an ALOHA protocol. For example, in some radio communication systems, some inbound radio channels (hereafter, "restricted channels") are geographically restricted to areas smaller than an area covered by the outbound radio channels while other inbound radio channels have coverage substantially equivalent to the outbound radio channels. The restricted channels are not as efficient for transmitting inbound messages using an ALOHA protocol, because the selective call device may not be in the coverage area of the restricted channel.

Thus, what is needed is an improved technique of selecting an inbound channel which is to be used for transmitting an inbound message using an ALOHA protocol in a communication system.

SUMMARY OF THE INVENTION

Accordingly, in a first aspect of the present invention, a method is used in a selective call device. The selective call device is used in a communication system having a set of outbound channels for transmitting messages to a plurality of selective call devices from a system controller and a set of inbound channels for receiving messages at the system controller from a plurality of selective call devices. The method includes the steps of receiving a subset identifier transmitted by the system controller in a channel of the set of outbound channels, identifying from the subset identifier an ALOHA subset of the set of inbound channels, and transmitting a first message to the system controller using an ALOHA protocol on an inbound channel which is in the ALOHA subset of the set of inbound channels when the first message is a first message type.

In a second aspect of the present invention, a method is used in a selective call device. The selective call device is used in a radio communication system having a set of outbound channels for transmitting messages to a plurality of selective call devices from a system controller and a set of inbound channels for receiving messages at the system controller from a plurality of selective call devices. The method includes the steps of receiving a subset identifier and an outbound/inbound identifier transmitted by the system controller in a channel of the set of outbound channels, identifying from the subset identifier an ALOHA subset of the set of inbound channels, and identifying from the outbound/inbound identifier a position of an ALOHA portion of each of the ALOHA subset of the set of inbound channels, identifying an inbound channel which is in the ALOHA subset of the set of inbound channels, and transmitting a first message to the system controller using an ALOHA protocol during an ALOHA portion of the identified inbound channel.

In a third aspect of the present invention, a selective call device is for use in a communication system. The communication system has a set of outbound channels for transmitting messages to a plurality of selective call devices from a system controller and a set of inbound channels for receiving messages at the system controller from a plurality of selective call devices. The selective call device includes a transmitter for transmitting a first message and a processing system. The processing system, which is coupled to the transmitter, receives a subset identifier transmitted by the system controller in a channel of the set of outbound channels, identifies from the subset identifier an ALOHA subset of the set of inbound channels, and generates the first message and couples the first message to the transmitter for transmission to the system controller using an ALOHA protocol on an inbound channel which is in the ALOHA subset of the set of inbound channels when the first message is a first message type.

In a fourth aspect of the invention, a selective call device is used in a radio communication system. The radio communication system has a set of outbound channels for transmitting messages to a plurality of selective call devices from a system controller and a set of inbound channels for receiving messages at the system controller from a plurality of selective call devices. The selective call device includes: a receiver for receiving a subset identifier and an outbound/inbound identifier transmitted by the system controller in a channel of the set of outbound channels; a transmitter for transmitting a first message; and a processing system coupled to the transmitter. The processing system identifies from the subset identifier an ALOHA subset of the set of inbound channels, and identifies from the outbound/inbound identifier a position of an ALOHA portion of each of the ALOHA subset of the set of inbound channels. The processing system identifies an inbound channel which is in the ALOHA subset of the set of inbound channels and generates the first message. The processing system couples the first message to the transmitter for transmission to the system controller using an ALOHA protocol during an ALOHA portion of the identified inbound channel when the first message is a first message type.

In a fifth aspect of the present invention, a system controller is for use in a communication system. The communication system includes selective call devices and the system controller. The communication system has a set of outbound channels for transmitting messages to a plurality of selective call devices from a system controller and a set of inbound channels for receiving messages at the system controller from a plurality of selective call devices. The system controller includes a processing system for generating a subset identifier which identifies an ALOHA subset of the set of inbound channels for use by a set of the selective call devices and a cell site controller for coupling the subset identifier to a transmitter which transmits the subset identifier in a channel of a set of outbound channels to the set of selective call devices.

DETAILED DESCRIPTION OF THE INVENTION

Figure 1:
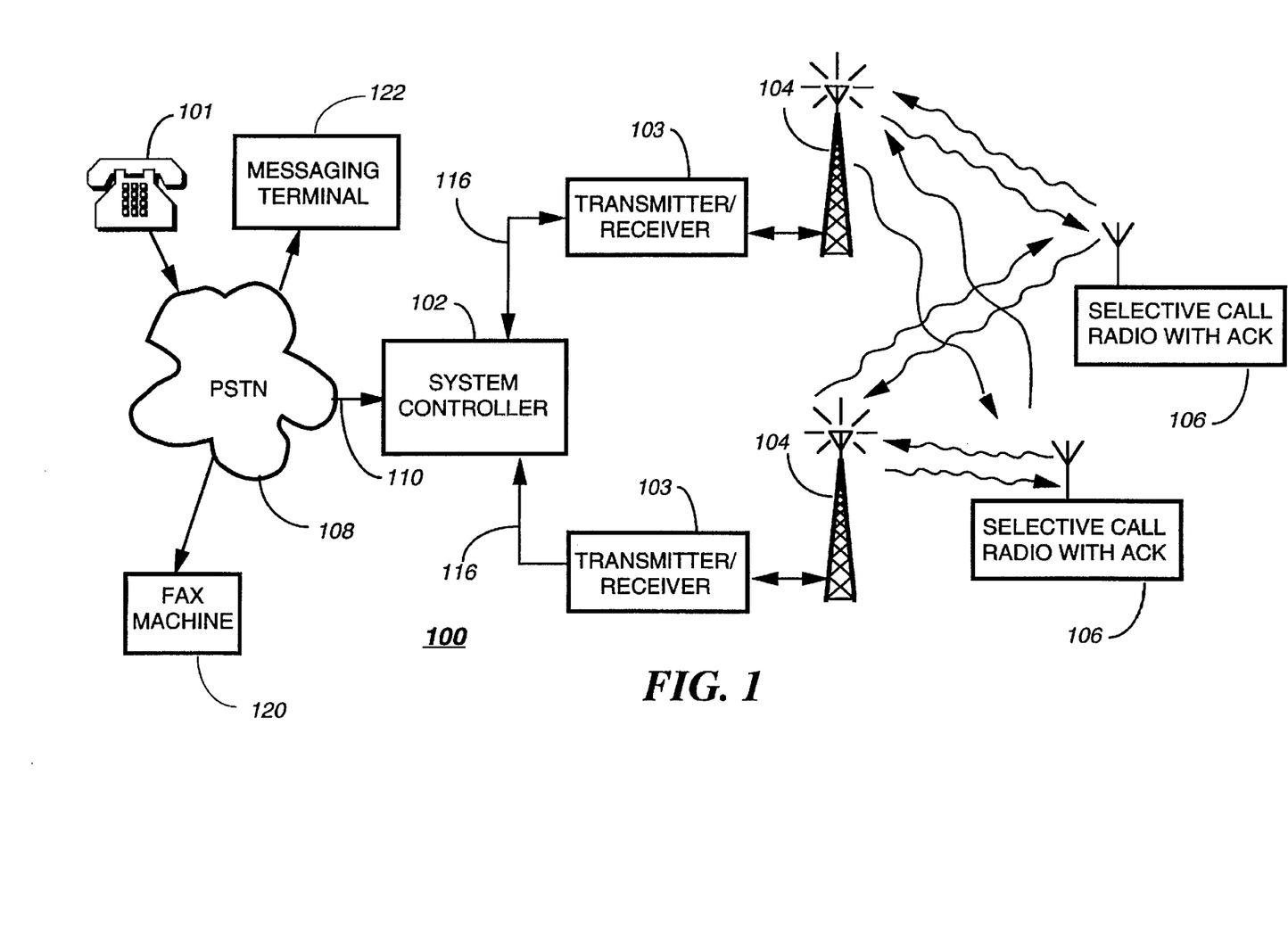
FIG. 1 is an electrical block diagram of a radio communication system, in accordance with the preferred embodiment of the present invention.

Referring to FIG. 1, an electrical block diagram of a radio communication system 100 is shown in accordance with the preferred and alternative embodiments of the present invention. The radio communication system 100 comprises a message input device, such as a conventional telephone 101, a facsimile machine 120 or a messaging terminal 122, connected through a conventional switched telephone network (STN) 108 by conventional telephone links 110 to a system controller 102. The system controller 102 oversees the operation of a plurality of radio frequency transmitter/receivers 103, through one or more communication links 116, which typically are twisted pair telephone wires, and additionally can include RF, microwave, or other high quality audio communication links. The system controller 102 encodes and decodes inbound and outbound telephone addresses into formats that are compatible with land line message switch computers. The system controller 102 also functions to encode and schedule outbound messages, which can include such information as analog voice messages, digital alphanumeric messages, and response commands, for transmission by the radio frequency transmitter/receivers 103 to a plurality of selective call radios 106. The system controller 102 further functions to decode inbound messages, including unsolicited and response messages, received by the radio frequency transmitter/receivers 103 from the plurality of selective call radios 106.

An example of an outbound alphanumeric message intended for a selective call radio 106 is an alphanumeric page message entered from the messaging terminal 122. An example of an outbound analog message intended for a selective call radio 106 is a voice page message entered from the telephone 101. Examples of a response messages are acknowledgments and demand response messages. An acknowledgment is an inbound message transmitted by a selective call radio 106 which indicates successful reception of an outbound message. A demand response message is a message sent from a selective call radio in response to a command included in an outbound message from the system controller 102. An example of a demand response message is a text message initiated by the selective call radio 106, but which is not transmitted until after a demand response command is received from the system controller 102. The demand response command, in turn, was sent by the system controller 102 after an inbound message requesting permission to transmit the demand response message was communicated from the selective call radio 106 to the system controller 102. A response message is transmitted by an selective call radio 106 at a time scheduled by the system controller 102 and designated within an outbound demand message, or the demand response message is transmitted using an unscheduled technique which is a slotted ALOHA protocol, well known to one of ordinary skill in the art. When the demand response is transmitted using an ALOHA protocol, it is called a demand ALOHA response message. An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a scheduled or demand response which can include data such as alphanumeric data. Unsolicited messages are transmitted using the slotted ALOHA protocol. The inbound and outbound messages are included in outbound radio signals transmitted from, and inbound radio signals received by, a conventional antenna 104 coupled to the radio frequency transmitter/receiver 103.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network. Moreover, as one of ordinary skill in the art would recognize, the telephonic and selective call radio communication system functions may reside in separate system controllers 102 which operate either independently or in a networked fashion.

Each of the selective call radios 106 assigned for use in the radio communication system 100 has at least one address assigned thereto which is a unique selective call address. The selective call address enables the transmission of a message from the system controller 102 only to the addressed selective call radio 106.

It will be appreciated that the selective call radio 106 is one of several types of radios, including two way pagers, conventional mobile radios, conventional or trunked mobile radios which have a data terminal attached thereto, or which optionally have data terminal capability designed in. Each of the selective call radios 106 assigned for use in the radio communication system 100 has an address assigned thereto which is a unique selective call address. The address enables the transmission of a message from the system controller 102 only to the addressed selective call radio, and identifies messages and responses received at the system controller 102 from the selective call radio. Furthermore, each of one or more of the selective call radios 106 can have a unique telephone number assigned thereto, the telephone number being unique within the PSTN 108. A list of the assigned selective call addresses and correlated telephone numbers for the selective call radios is stored in the system controller 102 in the form of a subscriber data base.

Figure 2:
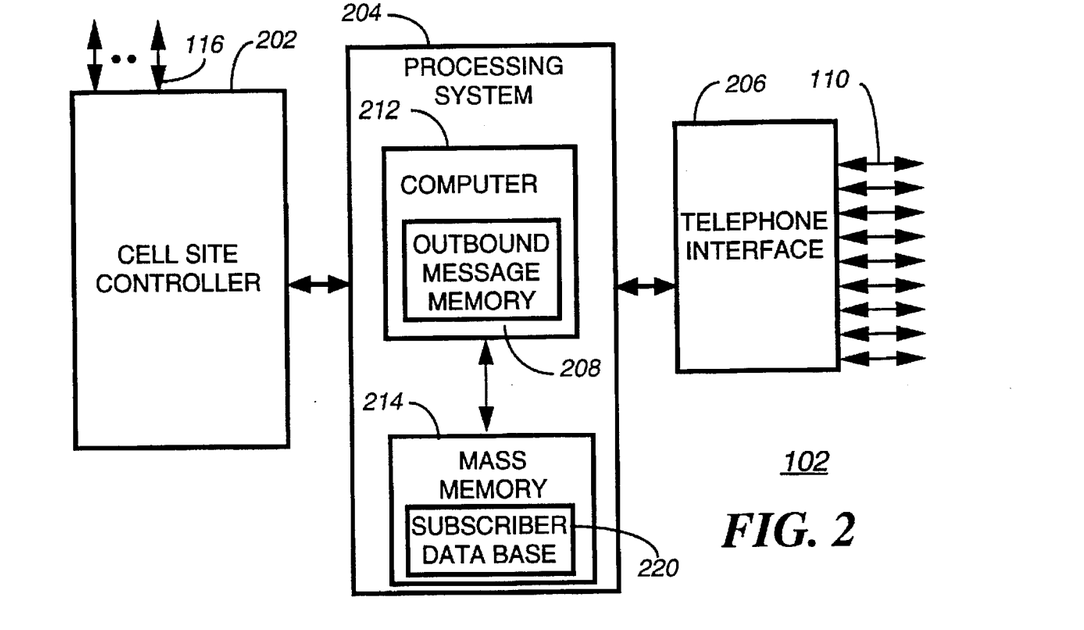
FIG. 2 is an electrical block diagram of a system controller used in the radio communication system, in accordance with the preferred and alternative embodiments of the present invention.

Referring to FIG. 2, an electrical block diagram of the system controller 102 is shown, in accordance with the preferred and alternative embodiments of the present invention. The system controller 102 queues data and stored voice messages for transmission to the selective call radios 106, connects telephone calls for transmission to the selective call radios 106, and receives acknowledgments, demand responses, unsolicited data and stored audio messages, and telephone calls from the selective call radios 106.

The system controller 102 comprises a cell site controller 202, a processing system 204, an outbound message memory 208, a subscriber data base 220, and a telephone interface 206. The cell site controller 202 is coupled to the radio frequency transmitter/receivers 103 (FIG. 1) and fixed system receivers 107 (FIG. 1) by the links 116. The cell site controller 202 transmits outbound messages which include selective call addresses to the transmitter/receivers 103 and controls the transmitter/receivers 103 to transmit radio transmission cycles which include the outbound messages, using one or more outbound channels as scheduled by a message handler function. The cell site controller 202 also processes inbound messages from the selective call radios 106. The inbound messages are received by the transmitter/receivers 103 and fixed system receivers 107 on a set of inbound radio channels, and are coupled to the cell site controller 202. The processing system 204, which includes the message handler function for routing and processing messages, is coupled to the cell site controller 202, a telephone interface 206, the subscriber data base 220, and the outbound message memory 208. The telephone interface 206 handles the switched telephone network 108 (PSTN) (FIG. 1) physical connection, connecting and disconnecting telephone calls at the telephone links 110, and routing the audio signals between the telephone links 110 and the processing system 204.

The subscriber data base 220, which is coupled to the processing system 204, stores information for each subscriber, including a correlation between a selective call address assigned to each selective call radio 106 and the telephone number used within the PSTN 108 to route messages and telephone calls to each selective call radio 106, as well as other subscriber determined preferences, such as hours during which messages are to be held back from delivery to the selective call radio 106. The outbound message memory 208 is for storing a queue of messages which are queued for delivery to at least one of the plurality of selective call radios 106, wherein each message of the queue of messages is associated with a selective call address, also stored in the outbound message memory 208, of one of the plurality of selective call radios 106 for which each message is intended.

Analog messages are converted to digital form by the processing system 204, prior to being stored in the outbound message memory 208. The message handler function schedules outbound messages and the selective call addresses associated therewith for transmission within a transmission cycle, by scheduling, as necessary, portions of messages within frames of a transmission cycle. As described above, messages may have either digital information, such as a alphanumeric message, or analog information, such as voice. A digital portion of a cycle which, in accordance with the preferred embodiment of the present invention is one or more control frames, is prepared for transmission by the message handler function, which determines from the subscriber data base 220 the selective call addresses of selective call radios associated with both numeric and analog messages which are included in the cycle. An analog message is included within one or more analog frames. Inasmuch as the analog information is typically one or more voice signals, the analog frame is alternatively called a voice frame.

The message handler function also identifies inbound messages as being associated with one of the selective call radios in the subscriber data base 220 and identifies response messages as being associated with one of the outbound messages in the outbound message memory 208. As one example of an operation of the system controller 102, the delivery of an outbound message stored in the outbound message memory 208 is completed when: the outbound message has been communicated to the intended selective call radio 106; the outbound message is acknowledged by an inbound acknowledgment generated by the selective call radio 106; the outbound message is presented on a display of the selective call radio 106 by a user action; a user inbound response is generated by a user and communicated back to the system controller 102 from the selective call radio 106; and the user inbound response is identified by the message handler function as having been generated by the user specifically in response to the outbound message. In this example, the message handler function generates another message which is sent to the originator of the outbound message to notify the originator that the outbound message has been acknowledged by the selective call radio 106 and responded to by the user of the selective call radio 106.

The system controller 102 schedules transmissions of the demand responses and acknowledgments from the selective call radios 106. The scheduling of inbound messages under certain circumstances improves the throughput of the inbound channel in comparison to that achievable for an unscheduled, random input inbound channel organization scheme such as that used in an ALOHA system. As described in more detail below, a scheduled inbound channel may be a portion of the total time available in a half duplex single frequency radio channel (a single radio carrier frequency which is time shared for both outbound and inbound channels). Alternatively, the scheduled inbound channel may be some portion of the time available, or all of the time available, in a channel having a radio carrier frequency which is different than the outbound channel radio frequency. Methods for identifying scheduled times will be described below.

System controller 102 is preferably a model MPS2000® paging terminal manufactured by Motorola, Inc., of Schaumburg, Ill. The processing system 204 preferably includes a conventional computer system 212, and conventional mass storage media 214. The conventional computer system 212 preferably comprises a plurality of processors such as VME Sparc processors manufactured by Sun Microsystems, Inc. These processors include memory such as dynamic random access memory (DRAM), which serves as a temporary memory storage device for scratch pad processing such as, for example, the outbound message memory 208, acknowledgments received from the selective call radios 106, and for formatting of messages destined for the selective call radios 106. The conventional mass storage media 214 is preferably a conventional hard disk mass storage device. The subscriber data base 220 is preferably stored in the conventional mass storage media 214.

It will be appreciated that other types of conventional computer systems 212 can be utilized, and that additional computer systems 212 and mass storage media 214 of the same or alternate type can be added as required to handle the processing requirements of the processing system 204.

The processing system 204 performs functions including the message handler functions described above, which are conventional, and functions described below with reference to FIG. 6, which are unique. The conventional and unique functions are executed by the conventional computer system 212 and controlled by a set of program instructions stored in the mass storage media 214. The unique functions are controlled by a unique set of program codes generated using conventional programming tools. The cell site controller 202, and the telephone interface 206 are implemented using conventional input/output sections of the model MPS2000® paging terminal.

The radio communication system 100 of the present invention preferably utilizes a synchronous frame structure similar to FLEX™ (a high speed paging protocol by Motorola, Inc. of Schaumburg, Ill.) on the outbound channel for addressing, digital messaging, and voice messaging. As described above, two types of frames are used: control frames and voice frames. The control frames are preferably used for control, addressing, and delivery of digital messages to selective call radios 106. The voice frames are used for delivering analog voice messages to the selective call radios 106. Both types of frames are identical in length to standard FLEX™ frame and both frames begin with the standard FLEX™ synchronization. These two types of frames are time multiplexed on a single forward channel.

Figure 3:
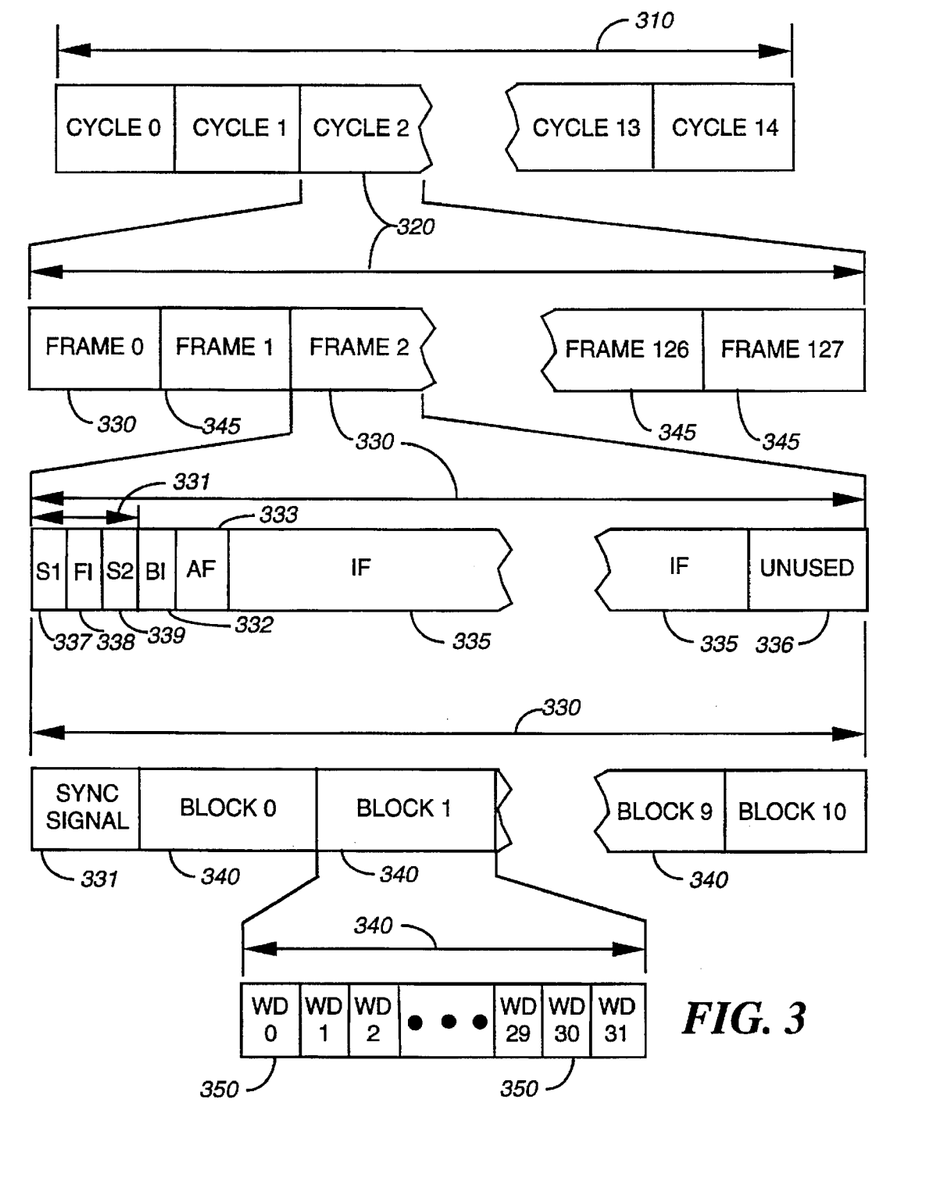
FIG. 3 is a timing diagram which illustrates features of the transmission format of an outbound signaling protocol utilized by the radio communication system, in accordance with the preferred and alternative embodiments of the present invention.

Referring to FIG. 3 a timing diagram which illustrates features of the transmission format of an outbound signaling protocol utilized by the radio communication system 100 of FIG. 1, and which includes details of a control frame 330, in accordance with the preferred and alternative embodiments of the present invention. Control frames 330 are also classified as digital frames 330. The outbound signaling protocol is subdivided into protocol divisions, which are an hour 310, a cycle 320, a frame 330, 345, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames including control frames 330 and analog frames 345 are transmitted in each of the cycles 320. Normally, all one hundred twenty eight frames are transmitted. One synchronization signal 331 lasting one hundred fifteen milliseconds and 11 one hundred sixty millisecond uniquely identified blocks 340 are transmitted in each of the control frames 330. The synchronization signal 331 includes a first sync portion 337, a frame information word 338, and a second sync portion 339. The frame information word 338 includes 21 information bits and 11 parity bits. A bit rate of 1600 bits per second (bps), 3200 bps, or 6400 bps is usable during the blocks of each control frame 330. The bit rate of the blocks 340 of each control frame 330 is communicated to the selective call radios 106 during the synchronization signal 331. When the bit rate is 1600 bps, 8 thirty two bit uniquely identified words 350 are transmitted in each block 340. For bit rates of 3200 bps or 6400 bps, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are for information, in a manner well known to one of ordinary skill in the art. The bits and words 350 in each block 340 are transmitted in an interleaved fashion using techniques well known to one of ordinary skill in the art to improve the burst error correction capability of the protocol.

Information is included in each control frame 330 in information fields, comprising system information in the frame information word 338 and a block information field (BI) 332, one or more selective call addresses in an address field (AF) 333, one or more of a set of vector packets, short message packets, and long messages in the information field (IF) 335, and an unused field 336 having no useful information therein. One aspect of system information included in the frame information word 338 is the frame number and the cycle number. The cycle number is a number from zero to 15 which identifies each cycle 320. The frame number is a number from zero to one hundred twenty seven which identifies each frame 330 of a cycle 320. The block information field 332 includes information which all active (i.e., not in a battery savings mode) selective call radios 106 decode during the control frame 330. This is called global information. Each vector packet and short message packet in the information field 335 of a frame 330 corresponds to at least one of the addresses in the address field 333 of the same frame 330. Each long message in the information field 335 corresponds to at least one vector packet in the information field 335 of at least one or more frames 330. The boundaries of the fields 332, 333, 335, 336 are defined by the words 350, not by the blocks 340, and the length of the fields 332, 333, 335, 336 are variable, depending on factors such as the type and amount of system information included in the block information field 332, the type of addresses used, and the amount of information in each message. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call radio 106 which has been activated for standard service are preferably scheduled for transmission in a predetermined one of the frames 330 of each cycle 320, so as to allow the particular selective call radio 106 to go into a low power (non-receive) mode during other frames when short messages and vectors are not included for the particular selective call radio 106. The block information field 332 in frame zero includes the following real time information: year, month, day, date, hour, minute, and one-eighth minute.

The vectors contain information which specifies the starting word of a long message in terms of the protocol divisions described above, and additionally, radio channel information such as radio channel frequency, subchannel offset from the radio channel frequency. The starting position and length of a long message, a short message, or a vector packet define the protocol position of the long message, short message, or vector packet.

When a selective call radio 106 detects its address within a frame 330, the selective call radio 106 processes the associated vector packet or short message packet within the frame 330. When a selective call radio 106 decodes a vector packet in a frame 330 which corresponds with its selective call address, the selective call radio 106 is directed to receive and decode a long message or an analog message in either the same frame 330, or another control frame 330 or an analog frame 345.

Figure 4:
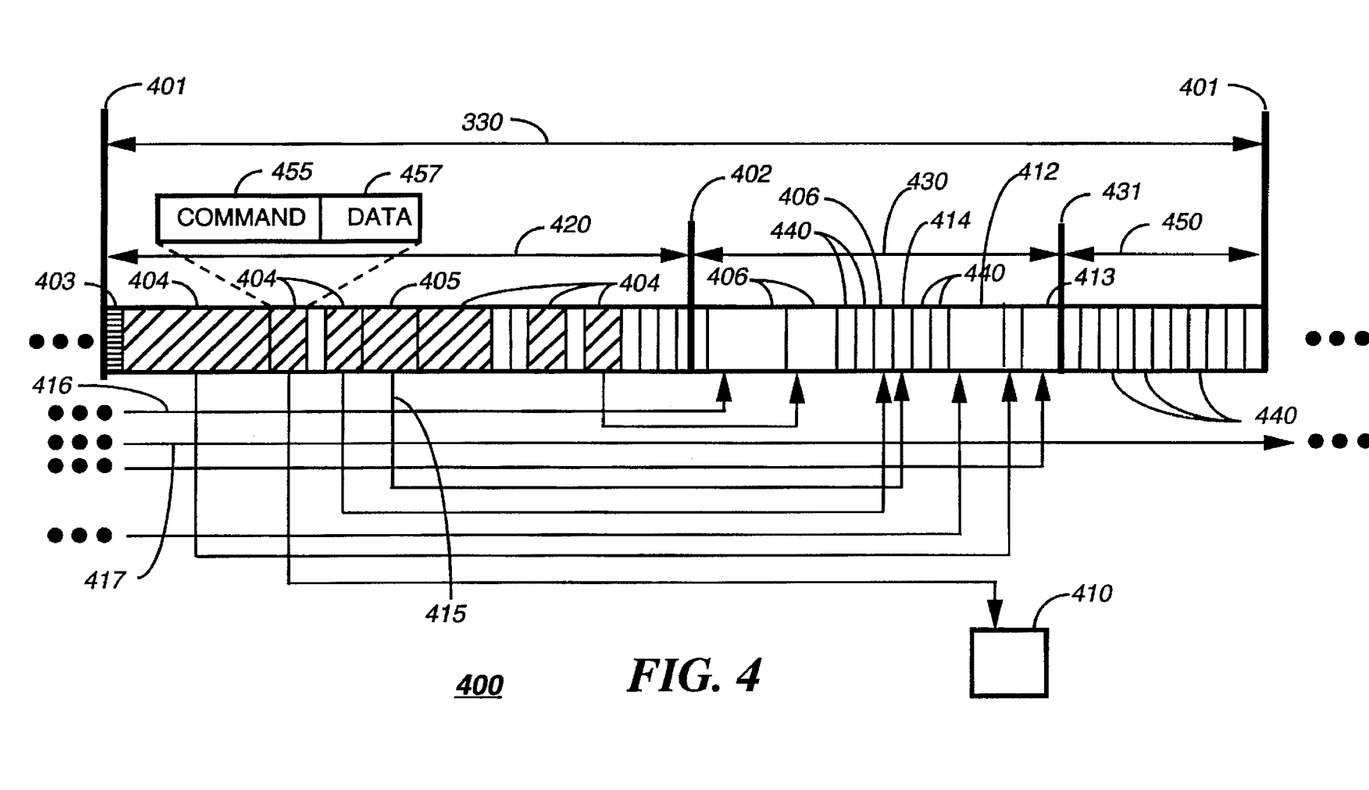
FIG. 4 is a timing diagram of outbound and inbound channel radio signals for a first type of the radio communication system, in accordance with the preferred embodiment of the present invention.

Referring to FIG. 4, a timing diagram 400 shows outbound and inbound channel radio signals for a first type of radio communication system, in accordance with the preferred embodiment of the present invention. The outbound channel radio signal, which is transmitted during an outbound portion 420 of a control frame 330, and the inbound channel radio signals, which are transmitted during an inbound portion of the control frame 330, are time division duplexed on the same radio carrier frequency. The outbound channel radio signal is generated and transmitted using the protocol described with reference to FIG. 3. The inbound channel radio signal is generated and transmitted using a conventional digital protocol having a synchronization portion and information words which are error protected. The inbound channel radio signal is transmitted beginning at a time slot 440 boundary. The control frame 330 shown in FIG. 4 is preceded and succeeded by control frames 330 and analog frames 345 (not shown in FIG. 4), the order of which is determined by the type of messages generated for transmission from the transmitter/receivers 103. The inbound portion of the control frame 330 comprises a scheduled portion 430 and an ALOHA portion 450. When a selective call radio 106 transmits an inbound message, the message is transmitted beginning at one of a predetermined number of periodic time slots 440 defined during each frame 330, 345 of the outbound signaling protocol.

During the outbound portion 420, an outbound channel radio signal is transmitted from the transmitter/receiver 103 to one or more of the selective call radios 106. The synchronization signal 331 (FIG. 3), block information field 332 (FIG. 3), address field 333 (FIG. 3) are shown as a segment 403 (FIG. 4) at the beginning of the outbound portion 420 of the control frame 330. A plurality of outbound messages 404, 405 are transmitted within the outbound portion 420 of the control frame 330. The outbound portion 420 starts at the beginning of the control frame 330 and ends at an outbound/inbound boundary 402. The scheduled portion 430 is at a position in the control frame 330 which starts at the outbound/inbound boundary 402 and ends at a scheduled/ALOHA boundary 431. An outbound/inbound identifier which is transmitted in a block information field 332 of a control frame 330 identifies the position of the outbound/inbound boundary 402 relative to the beginning 401 of the control frame 330 as a number of the time slots 440. The ALOHA portion 450 is at a position in the control frame 330 which starts at the scheduled/ALOHA boundary 431 and ends at the beginning 401 of the next frame 330, 345. A protocol separation identifier which is transmitted in a block information field 332 of a control frame 330 identifies the position of the scheduled/ALOHA boundary 431 relative to the outbound/inbound boundary 402 of the control frame 330 as a number of the time slots 440. A plurality of scheduled responses 406, 410, 412, 413, 414 are transmitted as data units, each data unit extending over one or more time slots 440. For example, scheduled response 410 is four time slots 440, scheduled response 412 is five time slots 440, and scheduled response 413 is two time slots 440. Each of the plurality of scheduled responses 406, 410, 412, 413, 414 is a radio signal transmitted from one of the selective call radios 106 in response to a command 455 which is completed in one of the outbound messages 404, 405. Scheduled response 410 is transmitted by one of the selective call radios 106 simultaneously with portions of scheduled responses 412 and 413, which are transmitted by other selective call radios 106. Scheduled response 410 is an example of a scheduled response which overlaps, in time, other scheduled responses 412, 413. A scheduled response overlap condition will occur, for example, when the system controller 102 schedules different selective call radios 106 to transmit scheduled responses, of which at least some parts are expected to be received at the same time by receivers in different geographically separated transmitter/receivers 103.

The start time of each outbound message 404 is defined as a frame number, block number, and word number. A command 455 is included in one or more of the outbound messages 404, identifying one of the selective call radios 106 by a selective call address of the identified selective call radio 106, as well as a scheduled response time at which the identified selective call radio 106 transmits a scheduled response in an inbound channel radio signal, the scheduled response comprising a data unit. The command 455 includes a designated length of the data unit. The outbound messages 404 also may include data 457, such as a alphanumeric information message. The start time of each scheduled response 406, 410, 412, 413, 414 is defined relative to the outbound/inbound boundary 402.

Synchronization and timing information required by the selective call radios in the radio communication system 100 for both receiving during the outbound portion of the control frame 330 and transmitting during the inbound portion of the control frame 330 is determined from the segment 403 and the outbound messages 404. When a selective call radio 106 receives the outbound radio signal, the selective call radio 106 processes the outbound message 404 included in the outbound radio signal when the outbound message 404 includes the selective call address of the selective call radio, thus identifying the selective call radio 106 for processing the outbound message 404. When a command 455 is received within the outbound message 404, or in a plurality of outbound messages and processed by the selective call radio 106, the selective call radio 106 then transmits one of the scheduled responses 406, 410, 412, 413, 414 with the designated data unit length and at the scheduled response time commanded by the system controller 102 in the command 455. Correspondence between the commands 455 received by identified selective call radios in the outbound messages 404 and the scheduled responses 406, 410, 412, 413, 414 from the identified selective call radios is indicated in FIG. 4 by arrowed lines from outbound messages 404, 405 to the scheduled responses 406, 410, 412, 413, 414, of which an example is line 415, which connects from a command 455 completed in outbound message 405 to scheduled response 414. Another example is line 416, which connects from a command 455, not shown in FIG. 4, that is completed in an earlier control frame 330 than the control frame 330 shown in FIG. 4, to one of the scheduled responses 406 in FIG. 4. Another example is line 417 which indicates connection from a command 455, not shown in FIG. 4, that is completed in an earlier outbound control frame than the outbound control frame 330 shown in FIG. 4, to a scheduled response that is in a later control frame 330 than those shown in FIG. 4.

Figure 5:
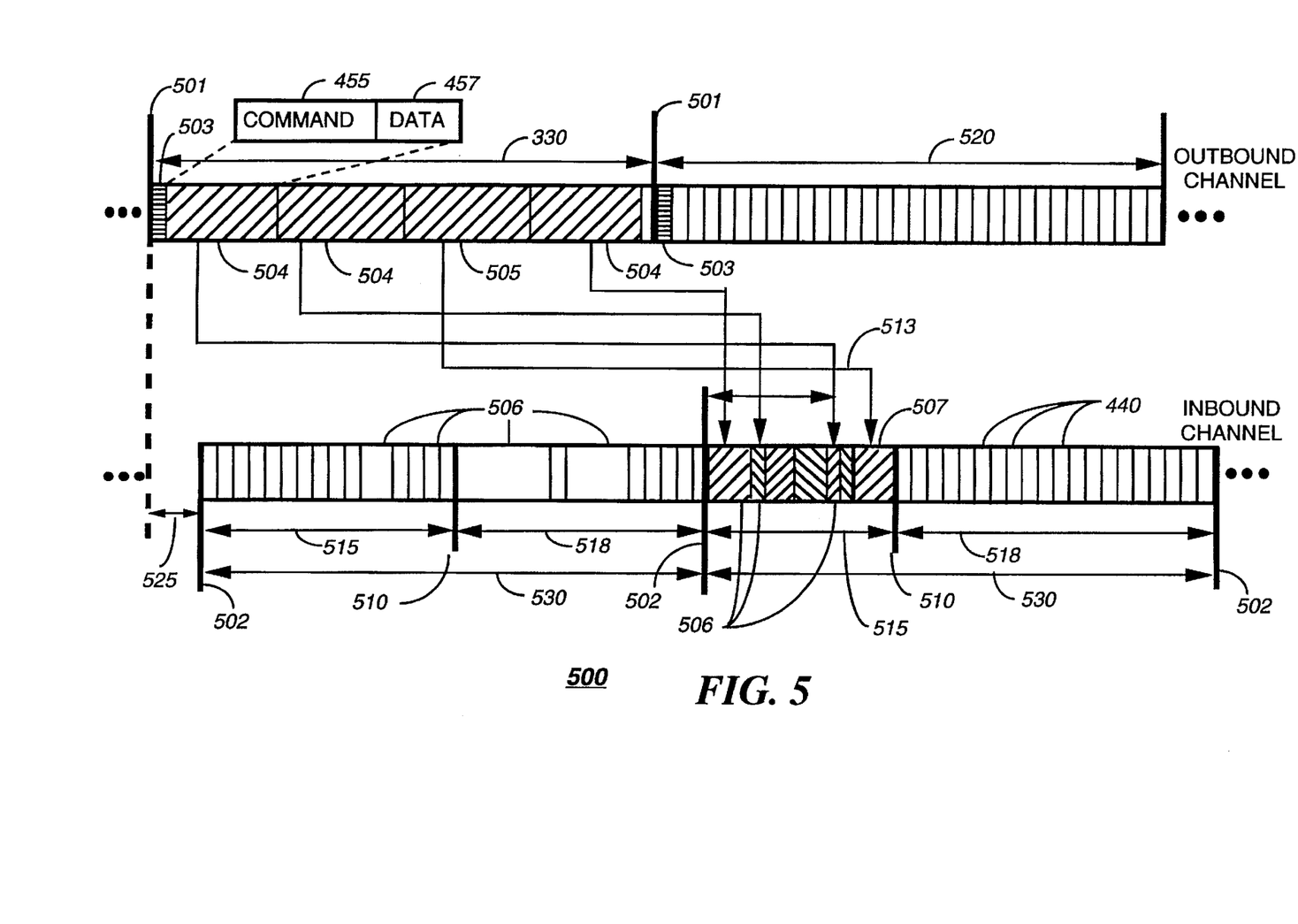
FIG. 5 is a timing diagram of outbound and inbound channel radio signals for a second type of the radio communication system, in accordance with the preferred and alternative embodiments of the present invention.

Referring to FIG. 5, a timing diagram 500 shows outbound and inbound channel radio signals for a second type of radio communication system, in accordance with the preferred and alternative embodiments of the present invention. The outbound channel radio signal, which is transmitted during an outbound control frame 330, is at a first radio carrier frequency. The inbound channel radio signals, which are transmitted during an inbound frame period 530, are at a second radio carrier frequency (i.e., frequency division multiplexed with the outbound channel radio signals). The outbound channel radio signal is generated and transmitted using the protocol described with reference to FIG. 3. The inbound channel radio signal is generated and transmitted using a conventional digital protocol having a synchronization portion and information words which are error protected. The inbound channel radio signal is transmitted beginning at a time slot 440 boundary. The inbound frame period 530 comprises a scheduled portion 515 and an ALOHA portion 518. A frame 520 which can be either a control frame 330 or an analog frame 345 is shown following the outbound control frame 330 in FIG. 5.

The control frame 330 duration and protocol divisions of the outbound channel radio signal are the same as those described above with reference to FIG. 3 for a control frame 330. Segments 403 (FIG. 4), which include the synchronization signal 331 (FIG. 3), block information field 332 (FIG. 3), address field 333 (FIG. 3), are transmitted at the beginning of the control frame 330 and the frame 520. A plurality of outbound messages 504, 505 are transmitted within the control frame 330 by the transmitter/receiver 103. (Outbound messages are also transmitted in the frame 520, and in other frames not shown in FIG. 5.) The inbound frame period 530 starts at an inbound frame boundary 502, extends to a next inbound frame boundary 502, and includes a plurality of time slots 440. The inbound frame boundary 502 has an offset time 525 measured from the beginning of the outbound control frame 330, which is constant and can be any value greater than or equal to zero. An inbound frame period 530 is identified by the same frame number as the outbound control frame 330 to which the offset time 525 is related. The scheduled portion 515 is at a position which starts at an inbound frame boundary 502 and ends at a scheduled/ALOHA boundary 510. The ALOHA portion is at a position which starts at the scheduled/ALOHA boundary 510 and ends at an inbound frame boundary 502. A plurality of scheduled responses 506, 507 are transmitted as data units during the scheduled portion 515, each data unit extending over one or more time slots defined during each inbound frame period 530. Each of the plurality of scheduled responses 506, 507 is a radio signal transmitted from one of the identified selective call radios in response to one of the outbound messages 504, 505. As described above for the first type of radio communication system 100 (but not shown in FIG. 5), a scheduled response can be transmitted by one of the selective call radios 106 simultaneously with portions of other scheduled responses which are transmitted by other selective call radios 106.

Each segment 403 includes the synchronization signal 331 (FIG. 3) which marks the outbound frame boundary 401 and includes information describing the offset time 525 to the inbound frame boundary 502, and a position of the scheduled/ALOHA boundary 510, for example as numbers of time slots. The offset time varies from 0 time slots to a value which may exceed the length of the outbound control frame 330. The outbound messages 504, 505 include one or more commands 455, each command 455 identifying one of the selective call radios and including the information described above for the first type of radio communication system 100. The start time of each scheduled response 506, 507 is defined relative to the inbound frame boundary 502.

Synchronization and timing information required by the selective call radios in the radio communication system 100 for both receiving on the outbound control frame 330 and transmitting during the inbound frame period 530 is determined from the segments 503 and the outbound messages 504. The operation of the selective call radios 106 is the same in as in the first type of radio communication system 100. Correspondence between the command 455 received by identified selective call radios in the outbound messages 504, 505 and the scheduled responses 506, 507 from the identified selective call radios is indicated in FIG. 5 by arrowed lines from outbound messages 504, 505 to the scheduled responses 506, 507, of which an example is line 513, which connects from a command 455 completed in the outbound message 505 to the scheduled response 507. In a manner similar to the example given in FIG. 4 for the first type of radio communication system 100, but not shown in FIG. 5, command 455 can be generated to schedule responses in inbound channel frames occurring after the next outbound channel frame from the one in which the command 455 is generated.

Figure 6:
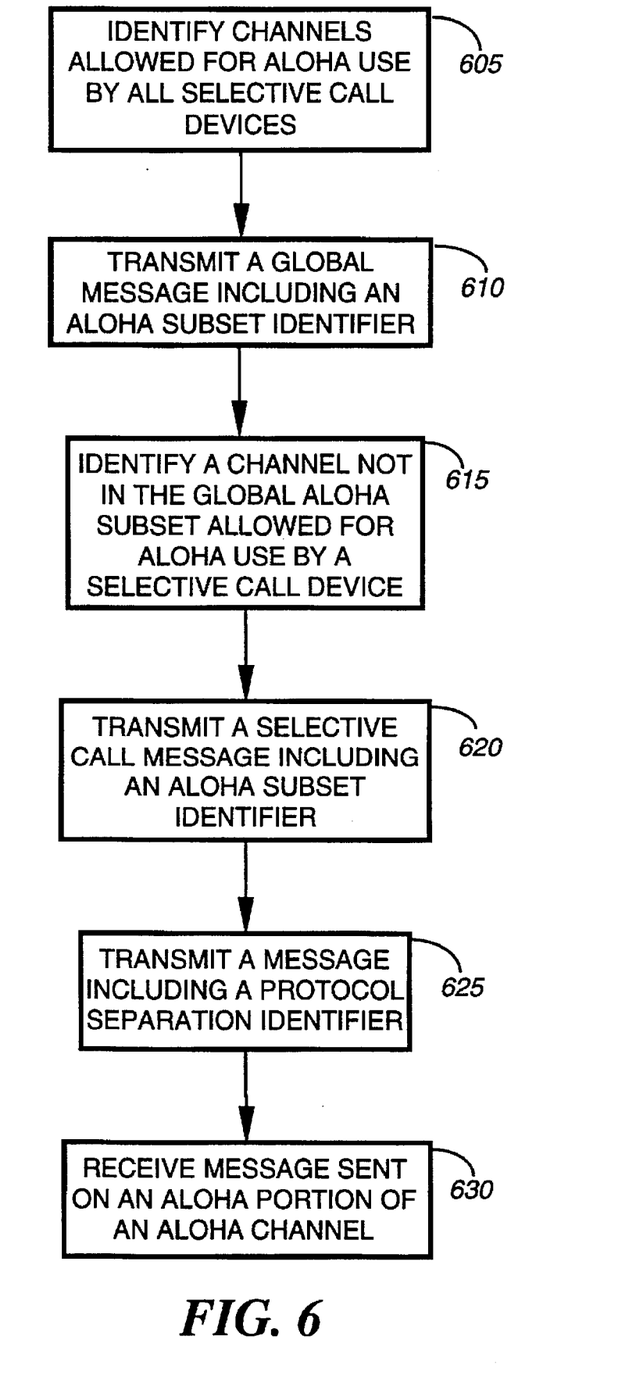
FIG. 6 is a flow chart of a method used in the system controller for identifying a subset of inbound channels usable by a selective call radio for transmitting an inbound message using an ALOHA technique, in accordance with the preferred and alternative embodiments of the present invention.

Referring to FIG. 6, a flow chart of a method used in the system controller 102 for identifying a subset of the inbound channels usable by one of the selective call radios 106 for transmitting an inbound message using an ALOHA technique is shown, in accordance with the preferred and alternative embodiments of the present invention. This method includes unique ALOHA channel control (ACC) functions programmed within the processing system 204 of the system controller 102. The ACC functions are controlled by a unique combination of conventional program instructions stored in the system controller 102, as described above. At step 605, an identification is made of a subset of the set of inbound channels which are allowed for use by all selective call radios 106 for transmitting messages using an ALOHA technique. This is preferably done by a system maintenance person, using an input terminal coupled to the system controller 102. The channels allowed for use by all selective call radios 106 are typically inbound channels which have ubiquitous coverage over a large geographic area of the radio communication system 100, whereas those which are not allowed for use by all selective call radios 106 are those for which the radio coverage area is a small portion of the total coverage area of the radio communication system 100. As an example, a system operator may temporarily add one or two inbound channels to provide reliable coverage of a convention site. These channels are not appropriate for use for all selective call radios 106 for ALOHA transmissions, so are not in the ALOHA subset of channels usable for all selective call radios 106. When this identification of the ALOHA subset is made, or changed, an outbound global message is generated by the system controller 102 for transmission at step 610 in a control frame 330 to all selective call radios 106. The global message is included in the block information field 332, and includes an identifier identifying which channels are in the ALOHA subset.

Under some circumstances, there are selective call radios 106 which can be appropriately allowed to use an inbound channel for ALOHA transmissions when the inbound channel is not appropriate for use by all selective call radios 106. An example of such a circumstance is a selective call radio 106 which is operating in a coverage area of an inbound channel which has restricted geographic coverage, as in the case of the convention center described above. Selective call radios 106 operating in the restricted area are appropriately allowed to use the inbound channel, which is a restricted ALOHA channel, used for restricted ALOHA transmissions. At step 615, identification of one or more channels usable for restricted ALOHA transmissions, preferably by a system maintenance person, using an input terminal. When an identification is made or changed of the subset of channels appropriate for restricted ALOHA transmissions, an outbound message is generated for transmission at step 620 to the selective call radio 106, or to a group of selective call radios 106, which includes an indication of the inbound channels so identified. At step 625, the system controller 102 transmits an protocol separation identifier in a control frame 330 which identifies the position of the ALOHA portion and scheduled portion of each inbound channel which is identified for use by any selective call radio 106 as inbound channel or restricted ALOHA channel for ALOHA transmissions or restricted ALOHA transmissions. At step 630, an inbound message is received at the system controller 102 which has been transmitted using an ALOHA protocol on an inbound channel identified at step 610 or 620.

Figure 7:
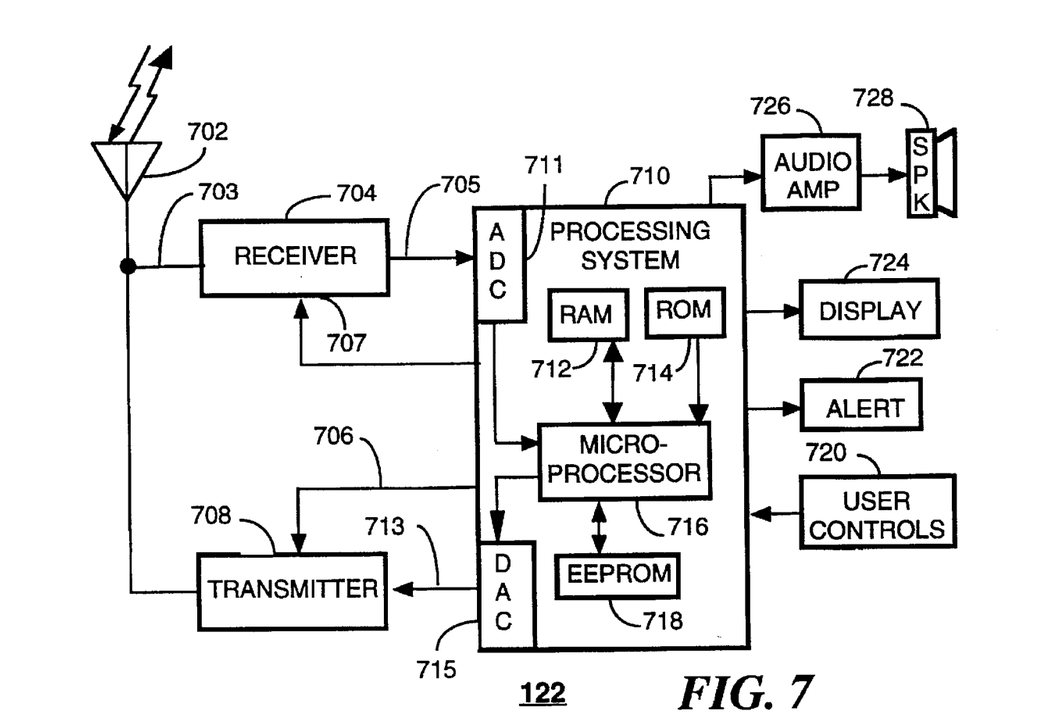
FIG. 7 is an electrical block diagram of a multichannel selective call radio, in accordance with the preferred and alternative embodiments of the present invention.

Referring to FIG. 7, an electrical block diagram of a multichannel selective call radio 106 is shown, in accordance with the preferred and alternative embodiments of the present invention. The selective call radio 106 includes an antenna 702 for intercepting and transmitting radio signals. The antenna 702 is coupled to a conventional receiver 704 wherein the intercepted signal 703, described above with reference to FIG. 3, is received. Receiving includes filtering to remove undesirable energy at off channel frequencies, amplification of the filtered signal, frequency conversion of the signal 703, and demodulation of the signal 703 in a conventional manner. The receiver 704 thereby generates a demodulated signal 705 which is coupled to a processing section 710. The receiver 704 also has a power control input 707 coupled to the processing system 710. The processing system 710 is coupled to a display 724, an alert 722, an audio amplifier 726, a transmitter 708, and a set of user controls 720. The transmitter 708 is coupled to the processing system 710 by a modulation signal 713 and a channel control signal 706, and is also coupled to the antenna 702. The audio amplifier 726 is coupled to a speaker 728. The processor section comprises a microprocessor which is coupled to an analog to digital converter (ADC) 711, a digital to analog converter (DAC) 715, a random access memory (RAM) 712, a read only memory (ROM) 714, and an electrically erasable programmable read only memory (EEPROM) 718. The demodulated signal is coupled to the ADC 711. The processing system 710 is coupled to the transmitter by the DAC 715. The ADC 711 converts the demodulated signal from an analog signal to a digital signal in a conventional manner, for processing by the processing system 710. When the demodulation signal is an analog signal, the analog signal is converted to a digital signal using an analog to digital conversion technique such as adaptive differential pulse code modulation (ADPCM). A bit recovery function converts digital signal to binary data in a conventional manner. A synchronization function acquires and maintains bit, word, block, frame, and cycle synchronization with the outbound signaling protocol from the synchronization signal 331(FIG. 3) of the frames 330, 345 (FIG. 3) in manner well known to one of ordinary skill in the art. A block word decoder function decodes the words 350 (FIG. 3) included in the blocks 340 of the outbound signaling protocol in a manner well known to one of ordinary skill in the art. A message processor function decodes outbound words and processes an outbound message when an address received in the address field 333 (FIG. 3) of the outbound signaling protocol matches an embedded address stored in the EEPROM 718, or when a global indication is received, in a manner well known to one of ordinary skill in the art for a selective call device 106. An outbound message which has been determined to be for the selective call radio 106 by the address matching or global indicator is processed by the message processor function according to the contents of the outbound message and according to modes set by manipulation of the set of user controls 720, in a conventional manner. An alert signal is typically generated when an outbound messages includes user information. The alert signal is coupled to the alert device 722, which is typically one of an audible and silent alerting device.

When the outbound message includes alphanumeric or graphic information, the information is displayed on the display 724 in a conventional manner by a display function at a time determined by manipulation of the set of user controls 720. When the outbound message includes audio information which is voice, the message handling function converts the voice signal to an analog signal which is coupled to the speaker 728 through the audio amplifier 726, which amplifies the signal in a conventional manner. Inbound messages are generated in digital form by a inbound message function, in response to user manipulation of the set of controls 720 or an event detected by the processing system 710, such as receipt of an outbound message or occurrence of a predetermined time of day, in a conventional manner. An inbound message is generated and encoded using the protocol described with reference to FIG. 4 and FIG. 5 for the reverse (inbound) channel and coupled to the DAC 715, wherein it is converted to an analog signal which modulates the transmitter 708, in a manner well known to one of ordinary skill in the art. The conventional transmitter 708 generates an RF signal, which is transmitted by the antenna 702.

The RAM 712, the EEPROM 718, the ADC 711 and the DAC 715 are preferably conventional parts. The ROM 714 is a conventional part having a unique set of masked program instructions, a portion of which perform the unique functions which are described below. Preferably, the microprocessor 716 is similar to the DSP56100 digital signal processor (DSP) manufactured by Motorola, Inc. It will be appreciated that other similar processors can be utilized for the microprocessor 716, and that additional processors of the same or alternate type can be added as required to handle the processing requirements of the processing system 710. It will be appreciated that other types of memory, e.g., ultraviolet erasable programmable read only memory (UVEPROM) or flash ROM, can be alternatively utilized for the ROM 714, as well as the RAM 712. It will be further appreciated that the RAM 712, the EEPROM 718, the ADC 711, the DAC 715, and the ROM 714, singly or in combination, can be integrated as a contiguous portion of the microprocessor 716.

The processing system 710 performs functions including at least portions of the bit recovery, synchronization, block word decoding, message processing, display, message handling, and inbound message generation described above, which are conventional, and other functions described below with reference to FIG. 8, which are unique. The conventional and unique functions are executed by the microprocessor 716 which is a conventional microprocessor controlled by a set of program codes stored in the mass storage media 214. The unique functions are controlled by a unique set of program codes generated using conventional programming tools.

It will be appreciated that the processing system can be alternatively implemented without the microprocessor 716, by implementing the conventional and unique functions described herein with a combination of conventionally available off the shelf integrated circuits such as CMOS shift registers, clocks, gates, counters, DAC, ADC, and RAM, and that further, some or all of the conventionally available off the shelf integrated circuits used to implement the processing system can be alternatively implemented in an application specific integrated circuit. It will be further appreciated that the microprocessor 716 can alternatively be a conventional microprocessor, such as a microprocessor in the family of 68HC11 microprocessors manufactured by Motorola, Inc., of Schaumburg, Ill.

Figure 8:
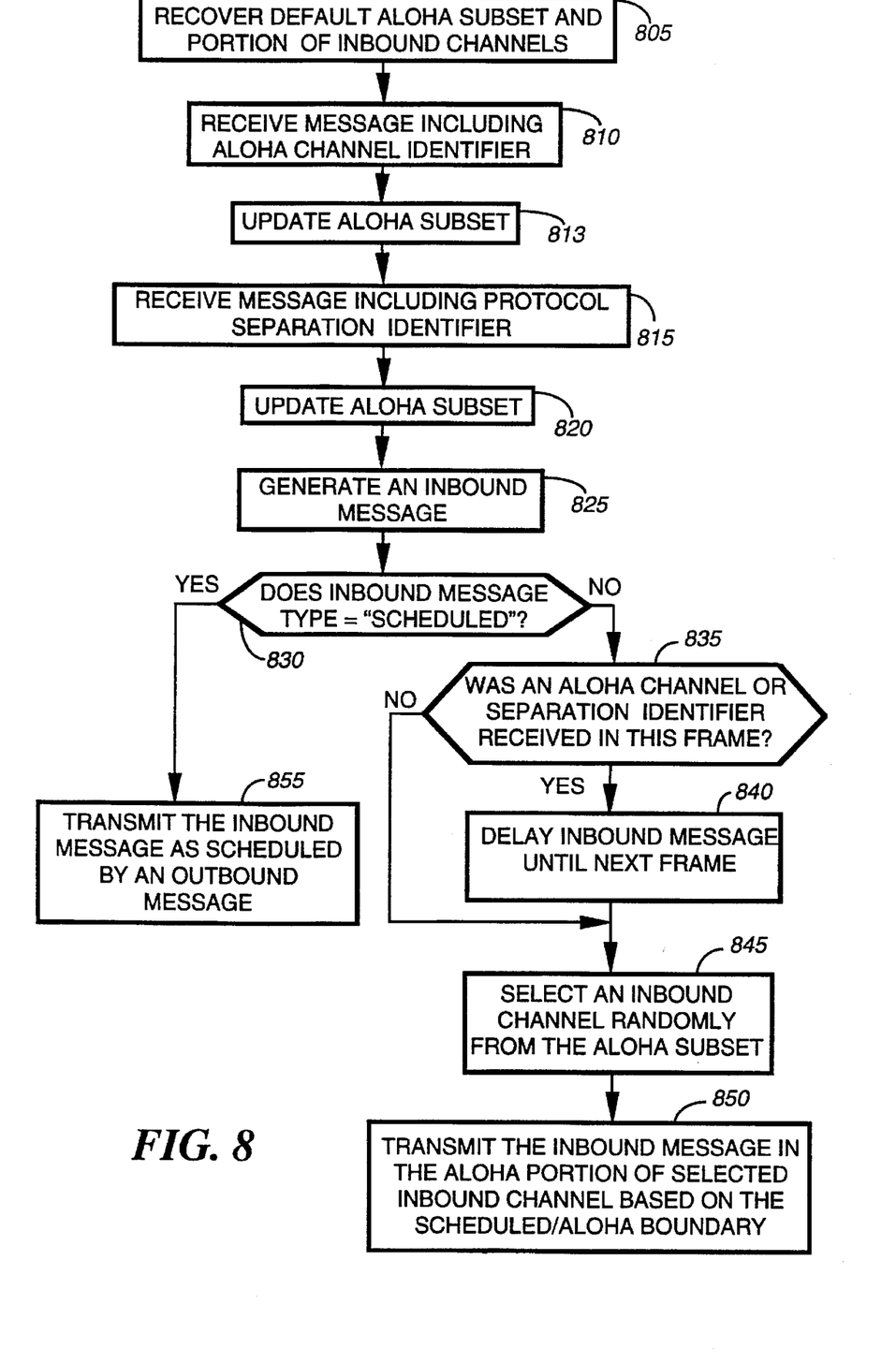
FIG. 8 is a flow chart of a method used in the selective call radio, in accordance with the preferred and alternative embodiments of the present invention.

Referring to FIG. 8, a flow chart of a method used in the selective call radio 106 is shown, in accordance with the preferred and alternative embodiments of the present invention. This method includes unique ALOHA channel selection (ACS) functions programmed within the processing system 710 of the selective call radio 106. The unique ACS functions are controlled by a unique combination of conventional program instructions stored in the processing system 710. At step 805, the processing system 710 recovers a default ALOHA subset of the set of inbound channels and a default set of ALOHA portions of inbound channels from the memory in the selective call device 106, and initializes an ALOHA subset of the set of inbound channels and a set of ALOHA portions of inbound channels. The initialized ALOHA subset of inbound channels identifies inbound channels in the set of inbound channels which are to be used by the selective call radio 106 for transmitting inbound messages which are to be transmitted using the ALOHA technique until the selective call radio 106 receives newer information defining or adding to the ALOHA subset of inbound channels. The technique for determining in the initialized ALOHA subset from the stored subset is conventional, but the use of the default ALOHA subset is unique. The default ALOHA subset can be anything from an empty set, i.e., no channels are designated for ALOHA transmissions, to a complete set of inbound channels. Typically, the default set includes at least one channel, thereby allowing an unregistered selective call radio 106 to transmit an unsolicited registration request using the ALOHA technique. The initialized set of ALOHA portions of inbound channels identifies scheduled/ALOHA boundary positions (and therefore ALOHA portions) for each inbound channel which is usable in the system for ALOHA transmissions. The default set of ALOHA portions of inbound channels can be one scheduled/ALOHA position used commonly for all inbound channels, or several values defining differing scheduled/ALOHA positions for each inbound channel or groups of inbound channels. The technique for determining the initialized set of ALOHA portions of inbound channels from the stored default set is conventional, but the use of the default set of ALOHA portions of inbound channels is unique. At step 810, the selective call radio 106 receives an outbound message which includes an ALOHA subset identifier, identifying a new ALOHA subset of the set of inbound channels for use by all selective call radios 106 active on the system. The ALOHA subset identifier comprises bits in the block information field 332 conventionally arranged to identify one or more inbound channels. The message is either a global message, identifying a new ALOHA subset for use by all selective call radios 106 active on the system, or a selective call message of either an individual or all call type, identifying the new ALOHA subset of the set of restricted inbound channels for use by an identified group of the selective call radios 106 or by only one addressed selective call radio 106. At step 813, the processing systems 710 updates the ALOHA subset stored therein by replacing the old subset with the new subset. It will be appreciated that alternative methods for identifying the subset inbound channels which are allowed for use by a selective call radio 106 for ALOHA transmissions are equally usable. For example, the subset of channels which are not allowed for ALOHA use could be identified, since each channel is either usable or not usable by each selective call radio 106 for ALOHA transmission purposes. In another alternative, an outbound message which is identifying channels which are (or the channels which are not) usable for ALOHA transmissions can indicate only changes to the ALOHA subset, such as by adding or deleting a channel or channels from the ALOHA subset. At step 815, the selective call radio 106 receives a global outbound message which includes a scheduled/ALOHA boundary identifier (protocol separation identifier) for an inbound channel. The scheduled/ALOHA boundary identifier identifies the position of the scheduled/ALOHA boundary 431 (FIG. 4), 510 (FIG. 5) of an inbound channel. The scheduled/ALOHA boundary identifier comprises bits in the block information field 332 conventionally arranged to identify a channel and an position of the scheduled/ALOHA boundary 431 (FIG. 4), 510 (FIG. 5) of an inbound channel. The position of the scheduled/ALOHA boundary 431, 510, which is stored in the selective call radio 106, is updated by the processing system 710 at step 820 by the information in the global message, in a manner similar to that described for the ALOHA subset of the set of inbound channels. It will be appreciated that the scheduled/ALOHA boundaries 431, 510 for all inbound channels which are in any ALOHA subset for any selective call radio 106 are determined by the default set of ALOHA portions or by transmission(s) of one or more scheduled/ALOHA boundary identifiers.

At step 825, the processing system 710 generates an inbound message. The inbound message is typically one of the following types: an unsolicited inbound message, a demand ALOHA response message, a scheduled acknowledgment, or a scheduled response. Unsolicited inbound messages and demand ALOHA response messages are a first type, "ALOHA", which are generated by the processing system 710 and transmitted by the transmitter 708 at time slots and on inbound channels as determined by the processing system 710 using the ALOHA technique, while the scheduled acknowledgments and scheduled responses are a second type, "scheduled", which are transmitted according a schedule received in an outbound message which includes necessary scheduling information such as inbound channel identification, starting time slot, and data rate. The timing, modulation, and channel selection are controlled by the processing system 710. At step 830, the type of inbound message is determined by the processing system 710. When the type is "scheduled" at step 830, the inbound message is transmitted at step 855 using the scheduled inbound channel at the scheduled time slot, which is during the scheduled portion of the inbound channel. When the type is not "scheduled" at step 830, and when the radio communication system 100 is a frequency division multiplex system as described with reference to FIG. 5, the processing system 710 determines further whether the outbound frame 330 in which the last ALOHA channel identifier or protocol separation identifier has the same frame number as the inbound frame in which the inbound message is generated for transmission at step 835. When the outbound frame 330 in which the last ALOHA channel or protocol separation identifier was received is determined to have the same frame number as the inbound frame in which the inbound message is generated at step 830, the transmission of the inbound message is delayed by the processing system 710 at step 840 until the next inbound frame 530. When the outbound frame 330 in which the last ALOHA channel or protocol separation identifier was received is determined not to have the same frame number as the inbound frame in which the inbound message is generated at step 835, or when the message has been delayed at step 840, one of the inbound channels in the ALOHA subset is chosen randomly at step 845 by the processing system 710, and the inbound message is then transmitted at a time slot determined by the processing system 710 in the ALOHA portion 450, 518 of the randomly selected channel using an ALOHA technique at step 850. For example, using the ALOHA technique, the inbound message is transmitted starting at a time slot relative to the scheduled/ALOHA boundary 431, 510 which is chosen at random over a predetermined interval of ALOHA time slots, in a manner well known to one of ordinary skill in the art.

When the radio communication system 100 is a time division duplex system such as described with reference to FIG. 4, steps 835 and 840 are eliminated.

Steps 835 and 840 are also eliminated in accordance with an alternative embodiment of the present invention used in a time division duplexed system as described with reference to FIG. 5. In the case of the alternative embodiment, an inbound message being transmitted using an ALOHA protocol is typically transmitted by an a selective call radio 106 in the ALOHA portion of the frame 330 in which message is generated. In the alternative embodiment of the present invention, an inbound message is transmitted using an ALOHA protocol in the inbound frame 530 in which the message is generated. The alternative embodiment has a deficiency that, in a frequency division multiplexed system as described with reference to FIG. 5, when the offset time 525 is less than the duration of one frame 330, 520, 530, a predetermined maximum ALOHA portion of the inbound message is defined, during which a boundary or subset change will not be transmitted in an outbound message and before which a selective call radio 106 will not transmit an ALOHA message. This avoids problems with an ALOHA message being transmitted in a non-ALOHA portion of a message during the frame in which the change is transmitted, but restricts the ALOHA portion to being less than an entire inbound frame.

It will be appreciated that the unique method and apparatus described above which provides an improved technique of channel selection of channels which are to be used for ALOHA transmission of inbound messages in a radio communication system 100 having multiple inbound channels provides similar improvements when used in systems which share some similarities with the described system, but which can be quite different in other respects. In particular, the system need not be radio nor even wireless. For example, in a wired point to multi-point system having a plurality of selective call devices and a plurality of inbound channels (e.g., a plurality of wire pairs), some inbound channels can be designated for all selective call devices to be for ALOHA transmissions and others for scheduled transmissions, by using the technique described above. For example, messages shorter than some fixed length can be designated for ALOHA transmission on an ALOHA channel.

Furthermore, when the communication system is a radio communication system, it need not be a radio communication system which uses a protocol of the FLEX™ family, such as the REFLEX™ or InFLEXion™ protocol. Other protocols such as the protocol used in the ARDIS™ system could be modified to provide the functions described herein.

By now it should be appreciated that there has been provided a method and apparatus for improving inbound message throughput by controlling the selection of an ALOHA subset of inbound channels used by a selective call device in a communication system having multiple inbound channels.

We claim:

1. A method used in a selective call device, wherein the selective call device is used in a communication system having a set of outbound channels for transmitting messages to a plurality of selective call devices from a system controller and a set of inbound channels for receiving messages at the system controller from a plurality of selective call devices, said method comprising the steps of:

receiving a subset identifier transmitted by the system controller in a channel of the set of outbound channels;

identifying from the subset identifier an ALOHA subset of the set of inbound channels; and transmitting a first message to the system controller using an ALOHA protocol on an inbound channel which is in the ALOHA subset of the set of inbound channels when the first message is a first message type.

2. The method according to claim 1, wherein the step of transmitting further comprises the step of selecting the inbound channel randomly from the ALOHA subset of the set of inbound channels.

3. The method according to claim 1, wherein the first message type is one of a unsolicited inbound message and a demand ALOHA response message.

4. The method according to claim 1, wherein in the step of transmitting, the first message is transmitted during an inbound frame which is next after an inbound frame which has a same frame number as an outbound frame number in which the subset identifier was received.

5. The method according to claim 1 wherein the step of identifying further comprises the step of recovering a default ALOHA subset of the set of inbound channels and a default set of scheduled/ALOHA boundaries from a memory in the selective call device.

6. The method according to claim 1 wherein said inbound channel has an ALOHA portion, and wherein in said step of transmitting, the first message is transmitted in the ALOHA portion of the inbound channel.

7. The method according to claim 1, wherein the selective call device is a radio device.

8. A method used in a selective call device, wherein the selective call device is used in a radio communication system having a set of outbound channels for transmitting messages to a plurality of selective call devices from a system controller and a set of inbound channels for receiving messages at the system controller from a plurality of selective call devices, comprising the steps of:

receiving a subset identifier and an outbound/inbound identifier transmitted by the system controller in a channel of the set of outbound channels;

identifying from the subset identifier an ALOHA subset of the set of inbound channels, and identifying from the outbound/inbound identifier a position of an ALOHA portion of each of the ALOHA subset of the set of inbound channels;

identifying an inbound channel which is in the ALOHA subset of the set of inbound channels; and transmitting a first message to the system controller using an ALOHA protocol during an ALOHA portion of the identified inbound channel.

9. A selective call device used in a communication system, wherein the communication system has a set of outbound channels for transmitting messages to a plurality of selective call devices from a system controller and a set of inbound channels for receiving messages at the system controller from a plurality of selective call devices, said selective call device comprising:

a transmitter for transmitting a first message; and a processing system, coupled to said transmitter, wherein said processing system receives a subset identifier transmitted by the system controller in a channel of the set of outbound channels;

identifies from the subset identifier an ALOHA subset of the set of inbound channels, and generates the first message and couples the first message to said transmitter for transmission to the system controller using an ALOHA protocol on an inbound channel which is in the ALOHA subset of the set of inbound channels when the first message is a first message type.

10. The selective call device according to claim 9, wherein the processing system selects the inbound channel randomly from the ALOHA subset of the set of inbound channels when generating the first message.

11. The selective call device according to claim 9, wherein the first message type is one of a unsolicited inbound message and a demand ALOHA response message.

12. The selective call device according to claim 9, wherein the processing system generates a second message and couples the second message to said transmitter using one of the set of inbound channels which is not one of the ALOHA subset when the second message is a second message type.

13. The selective call device according to claim 12, wherein the second message type is one of a scheduled acknowledgment and a scheduled response.

14. The selective call device according to claim 9, wherein in the processing system couples the first message to the transmitter during an inbound frame which is next after an inbound frame which has a same frame number as an outbound frame number in which the subset identifier was received.

15. The selective call device according to claim 9, wherein the selective call device further comprises a memory, coupled to said processing system, and wherein said processing system recovers a default ALOHA subset of the set of inbound channels and a default set of scheduled/ALOHA boundaries from the memory.

16. The selective call device according to claim 9, wherein said inbound channel has an ALOHA portion, and wherein said processing system couples the first message during the ALOHA portion of the inbound channel.

17. A selective call device used in a radio communication system, wherein the communication system has a set of outbound channels for transmitting messages to a plurality of selective call devices from a system controller and a set of inbound channels for receiving messages at the system controller from a plurality of selective call devices, said selective call device comprising:

a receiver for receiving a subset identifier and an outbound/inbound identifier transmitted by the system controller in a channel of the set of outbound channels;

a transmitter for transmitting a first message; and a processing system, coupled to said transmitter, wherein the processing system identifies from the subset identifier an ALOHA subset of the set of inbound channels, and identifies from the outbound/inbound identifier a position of an ALOHA portion of each of the ALOHA subset of the set of inbound channels, identifies an inbound channel which is in the ALOHA subset of the set of inbound channels, and generates the first message and couples the first message to said transmitter for transmission to the system controller using an ALOHA protocol during an ALOHA portion of the identified inbound channel when the first message is a first message type.

18. A system controller used in a communication system, wherein the communication system comprises selective call devices and the system controller, and wherein the communication system has a set of outbound channels for transmitting messages to a plurality of selective call devices from a system controller and a set of inbound channels for receiving messages at the system controller from a plurality of selective call devices, the system controller comprising:

a processing system for generating a subset identifier which identifies an ALOHA subset of the set of inbound channels for use by a set of the selective call devices; and a cell site controller for coupling the subset identifier to a transmitter which transmits the subset identifier in a channel of a set of outbound channels to the set of selective call devices.

19. The system controller according to claim 18, wherein said processing system generates a protocol separation identifier which is included in a second message which is transmitted to the selective call devices, wherein said protocol separation identifier identifies a position of an ALOHA portion and a scheduled portion of each of the ALOHA subset of the set of inbound channels.

20. The system controller according to claim 19, wherein said system controller further comprises a radio receiver and wherein the transmitter is a radio transmitter.

\* \* \* \* \*